US012747771B2

(12) United States Patent
Jang

(10) Patent No.: US 12,747,771 B2
(45) Date of Patent: Sep. 29, 2026

(54) ISOLATOR HAVING A BALL TYPE OPERATOR

(71) Applicant: CHAMSOL TECH CO., LTD., Incheon (KR)

(72) Inventor: Seong Cheol Jang, Incheon (KR)

(73) Assignee: CHAMSOL TECH CO., LTD., Incheon (KR)

( * ) Notice: Subject to any disclaimer, the term of this patent is extended or adjusted under 35 U.S.C. 154(b) by 259 days.

(21) Appl. No.: 18/289,536

(22) PCT Filed: Mar. 29, 2023

(86) PCT No.: PCT/KR2023/004186
§ 371 (c)(1),
(2) Date: Dec. 24, 2024

(87) PCT Pub. No.: WO2024/019252
PCT Pub. Date: Jan. 25, 2024

(65) Prior Publication Data

US 2025/0215954 A1 Jul. 3, 2025

(30) Foreign Application Priority Data

Jul. 22, 2022 (KR) ........................ 10-2022-0090848

(51) Int. Cl.
*F16F 15/02* (2006.01)
*F16M 5/00* (2006.01)

(52) U.S. Cl.
CPC ............. *F16F 15/021* (2013.01); *F16M 5/00* (2013.01)

(58) Field of Classification Search
None
See application file for complete search history.

(56) References Cited

U.S. PATENT DOCUMENTS 951,028 A * 3/1910 Schar ...................... E04H 9/023 52/167.5
3,146,979 A * 9/1964 Keetch ...................... F16F 7/00 248/563
5,081,806 A * 1/1992 Pommelet ............... E02D 27/34 52/167.5
5,689,919 A * 11/1997 Yano ....................... E04H 9/023 52/167.6

(Continued)

FOREIGN PATENT DOCUMENTS

JP 2002295054 A 10/2002
JP 2015137728 A 7/2015

(Continued)

OTHER PUBLICATIONS

International search report of PCT/KR2023/004186, Jun. 21, 2023, English translation.

*Primary Examiner* — Steven M Marsh
(74) *Attorney, Agent, or Firm* — STIP Law Group, LLC

(57) ABSTRACT

The invention is an isolator comprising an upper panel 31 and a lower panel 32 having an upper rolling recesses 33, 34 and a ball operator 35 provided between the upper rolling recess 33 and the lower rolling recess 34, and the lower rolling recess 34 includes a central rolling surface 36, a peak-line 37 along the upper edge of the central rolling surface 36, an inflected rolling surface 38 formed around the peak-line 37 and a disengagement prevention wall 39.

8 Claims, 11 Drawing Sheets

(56) References Cited

U.S. PATENT DOCUMENTS

| | | | | |
|---|---|---|---|---|
| 5,804,776 | A * | 9/1998 | Bizlewicz | F16F 15/02 181/207 |
| 5,905,804 | A * | 5/1999 | Lee | H04R 1/026 381/87 |
| 6,123,313 | A * | 9/2000 | Otsuka | E04H 9/023 248/580 |
| 6,505,806 | B1 * | 1/2003 | Glaesener | F16M 7/00 248/677 |
| 9,963,901 | B2 * | 5/2018 | Kanzaki | E04B 1/36 |
| 2006/0260221 | A1 * | 11/2006 | Kemeny | E04H 9/0235 52/167.5 |
| 2024/0240486 | A1 * | 7/2024 | Deigert | F16F 15/021 |

FOREIGN PATENT DOCUMENTS

| | | | |
|---|---|---|---|
| KR | 20050025723 | A | 3/2005 |
| KR | 101325640 81 | | 11/2013 |
| KR | 101843721 | B1 | 8/2018 |
| KR | 102498283 | B1 | 2/2023 |

* cited by examiner (a)

(b)

(a)

(b)

ISOLATOR HAVING A BALL TYPE OPERATOR

CROSS-REFERENCE TO RELATED APPLICATIONS

This application is the U.S. National Phase under 35 U.S.C. § 371 of International Application No. PCT/KR2023/004186, filed on Mar. 29, 2023, which in turn claims the benefit of Korean Application No. 10-2022-0090848, filed on Jul. 22, 2022, the disclosures of which are incorporated by reference into the present application.

TECHNICAL FIELD

The present invention relates to an isolator having a ball type operator, and more particularly to an isolator having a ball type operator capable of preventing the ball disengagement and the resulted function loss or breakdown of the isolating device with simple structure during the isolating operation.

BACKGROUND ART

Generally, isolator for heavy non-structural element such as important products, installations or apparatuses inside buildings, not for the structural elements such as foots or bearing walls of the building, includes a lower pane placed on the floor and an upper panel on which a protected object is placed, and an operator between the lower panel and the upper panel such as a ball or LM guide.

The conventional isolator having a ball type operator is configured that the lower panel and the upper panel have rolling recesses faced to each other, and a ball operator made of stainless steel is inserted between the recesses. But the conventional isolator is not provided with any particular device to prevent the ball from breaking away from the lower or upper, so that the ball should break way from the isolator during the isolating operation in case of large earthquake or long period vibration, which results in failure of isolation function or breakdown of the isolating device. Meanwhile, considering the above problem, some isolators are proposed to be provided with disengagement devices to prevent the ball from breaking away, but these isolators have complicated structure, and incur difficult assembling and increasing cost.

DISCLOSURE

Technical Problem

The invention is proposed to solve the above-mentioned problems, and the object of the invention is to provide an isolator having a ball type operator which can prevent the ball disengagement and the resulted function loss or breakdown with simple structure by changing the shape of recess without adding any complicated component.

Technical Solution

According to an aspect of the invention, there is provided an isolator having a ball type operator comprising:

an upper panel 31 on which a protected object is placed and having an upper rolling recess 33 on the bottom surface;

a lower panel 32 disposed on the floor corresponding to the upper panel 31 and having a lower rolling recess 34 on the top surface facing the upper recess 34 of the upper panel 32; and a ball operator 35 provided between the upper rolling recess 33 and the lower rolling recess 34 to roll between them, wherein;

at least the lower rolling recess 34 among the upper rolling recess 33 and the lower rolling recess 34 includes:

a central rolling surface 36 formed on the central part of the rolling recess 33, 34;

a peak-line 37 formed along the upper edge of the central rolling surface 36;

an inflected rolling surface 38 formed around the peak-line 37 and inflected against the central rolling surface 36 and extending outward horizontally or downward from the peak-line 37; and a disengagement prevention wall 39 formed around the edge of the inflected rolling surface 38 and extending upward to prevent the ball operator 35 form disengaging.

According to other aspect of the invention, there is provided an isolator having a ball type operator wherein, a ring shape ball guide 41 is inserted around the ball operator 35.

According to other aspect of the invention, there is provided an isolator having a ball type operator wherein, a sticky base pad 21 made of elastic material is provided under the lower panel 32.

According to other aspect of the invention, there is provided an isolator having a ball type operator wherein, elastic coatings 42 are provided on the upper rolling surface 33 and the lower rolling surface 34 including the disengagement prevention wall 39.

According to other aspect of the invention, there is provided an isolator having a ball type operator wherein, the upper panel 31 and the lower panel 32 is connected by elastic bands 50.

According to other aspect of the invention, there is provided an isolator having a ball type operator wherein, a separation plate 53 is placed on the upper panel 31 with being spaced apart to each other.

According to other aspect of the invention, there is provided an isolator having a ball type operator wherein, the separation plate 53 is supported on the upper panel 31 by elastic poles 54.

According to other aspect of the invention, there is provided an isolator having a ball type operator wherein, the elastic coating 42 on the central rolling surface 36 is formed to be thicker progressively from the center to outward.

Advantageous Effect

According to the invention, as the peak-line 37 is formed along the upper edge of the central rolling surface 36 of the upper rolling recess 33 and the lower rolling recess 34, and the inflected rolling surface 38 is inflected against the central rolling surface 36 and extending outward horizontally or downward from the peak-line 37, it will be resulted that the height of the disengagement prevention wall 39 increases without increasing the size or height of the upper panel 31 or the lower panel 32, so that the ball operator 35 can be effectively prevented from disengaging, that is, breaking away or escaping, and the moving speed of the ball operator 35 can be reduced because of the inflected rolling surface 38 outside the peak-line 37, which will also prevent disengaging of the ball operator 35 and decreasing of isolation effects.

And, according to the invention, as a ring shape ball guide 41 is inserted around the ball operator 35, the ball guide 41 can function as a weight or bumper, so it can reduce the moving or returning speed of the ball operator 35, which will be advantageously effective to prevent ball striking or ball disengagement in case of earthquake having long period of 1 sec or more, or a large scale earthquake which results in lifting of the upper panel 31.

In connection with this, if the upper panel 31 is lifted during the earthquake, the ball guide 41 keeps contacting the elastic coating 32 of the rolling surface with friction while the ball operator 35 moves so that the returning speed of the ball operator 35 may be reduced and the ball operator 35 is retained inside the upper panel 31 when the lifted upper panel 31 descends without the ball operator 35 being displaced or disengaged from or hit by the upper panel 31 to keep rolling regularly.

If the ball guide 41 is omitted, the ball operator 35 may contact the rolling surface by single contact point and the ball operator 35 may excessively slip. But according to the invention, the ball guide 41 may contact the rolling surface with increased friction so that the ball operator 35 can roll on the rolling surface stably to achieve satisfactory isolating effect without excessive slipping in spite of long period vibration or large scale earthquake.

And, according to the invention, as the elastic coating 42 is provided on all the surface of the rolling recesses 33, 34 including the disengagement prevention wall 39, the ball operator 35 may be prevented from excessive slipping and the shock-absorbing effect against the ball guide 41 is enhanced.

And, according to the invention, a sticky base pad 21 made of elastic material is provided under the lower panel 32, so the slipping of the isolator on the floor can be effectively prevented and shock-absorbing effect is also attained, so that the dislocating or lifting of the isolator by the vertical vibration can be avoided to achieve a stable support against the protected object. And, according to the invention, as the upper panel 31 and the lower panel 32 is connected by elastic bands 50, separation between the upper panel 31 and the lower panel 32 or disengagement of the ball operator 35 due to the horizontal or vertical vibration can be effectively prevented.

And, according to the invention, as a separation plate 53 is placed on the upper panel 31, the load of the protected object 10 is not directly transferred to the elastic band 50, so that the expanding and contracting action of the elastic band 50 is not restricted, and the elastic poles 54 is on the upper panel 31 to support the separation plate 53 which also contributes to elastically support the protected object 10.

And, according to the invention, as the elastic coating 42 on the central rolling surface 36 becomes thicker progressively from the center to outward, in case of large scale earthquake, the moving distance of the ball operator 35 can be reduced in proportion to the magnitude of earthquake advantageously.

DETAILED DESCRIPTION OF THE INVENTION

Figure 1:
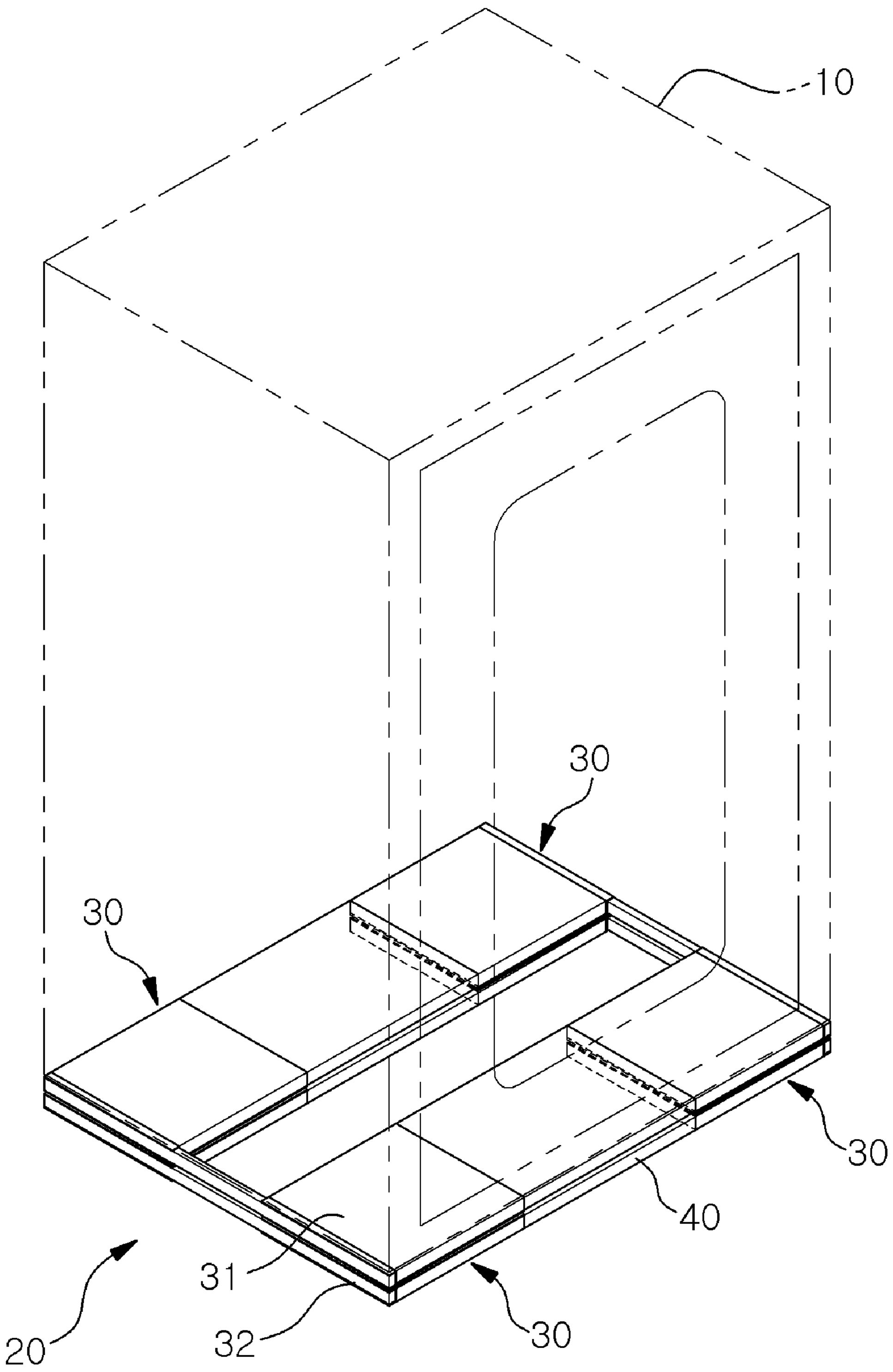
FIG. 1 is a perspective of one embodiment of the invention

Hereinafter, the preferred embodiments of the invention will be described with reference to the drawings. FIGS. 1 to FIG. 11 show various embodiments of the invention. A s shown in FIG. 1, the invention is an isolator to protect the protected object 10 such as an important apparatus, an installation or a cabinet from outer impact such as earthquake, and includes a plurality of isolation unit 30 disposed under the protected object 10 and being connected to each other by the connecting bar 40.

In order to install the isolation unit 30, a base pad 21 is first placed on the floor, and the isolation unit 30 is disposed on the base pad 21. The isolation unit 30 includes a lower panel 32 fixedly placed on the floor or the base pad 21, and an upper panel 31 corresponding to the lower panel 32, and on which the protected object 10 is placed. The base pad 21 can be attached on the bottom of the lower panel 32 beforehand, and the lower panel 32 together with the base pad 21 can be placed on the floor.

Figure 2:
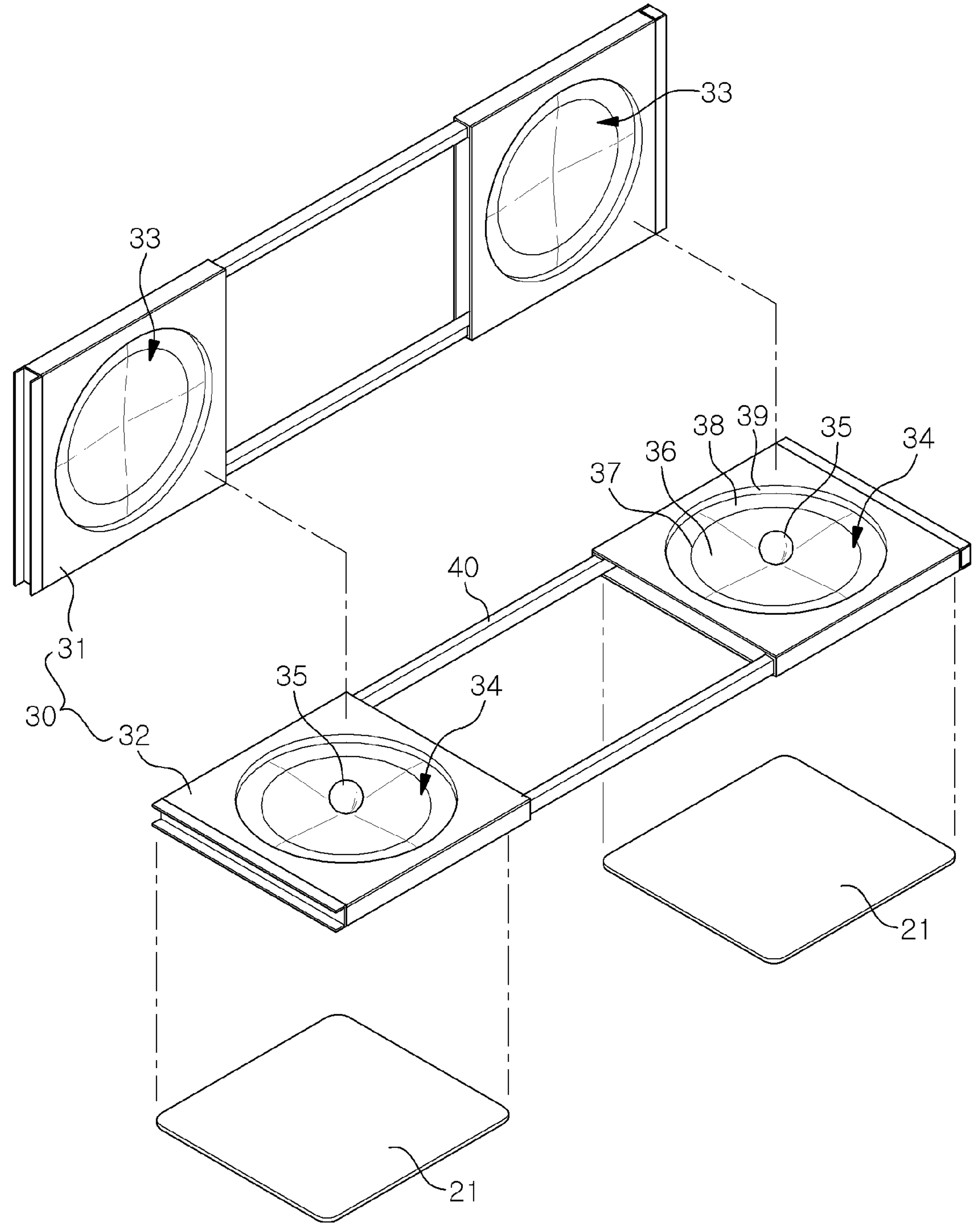
FIG. 2 is an exploded view of the above embodiment of the invention
Figure 3:
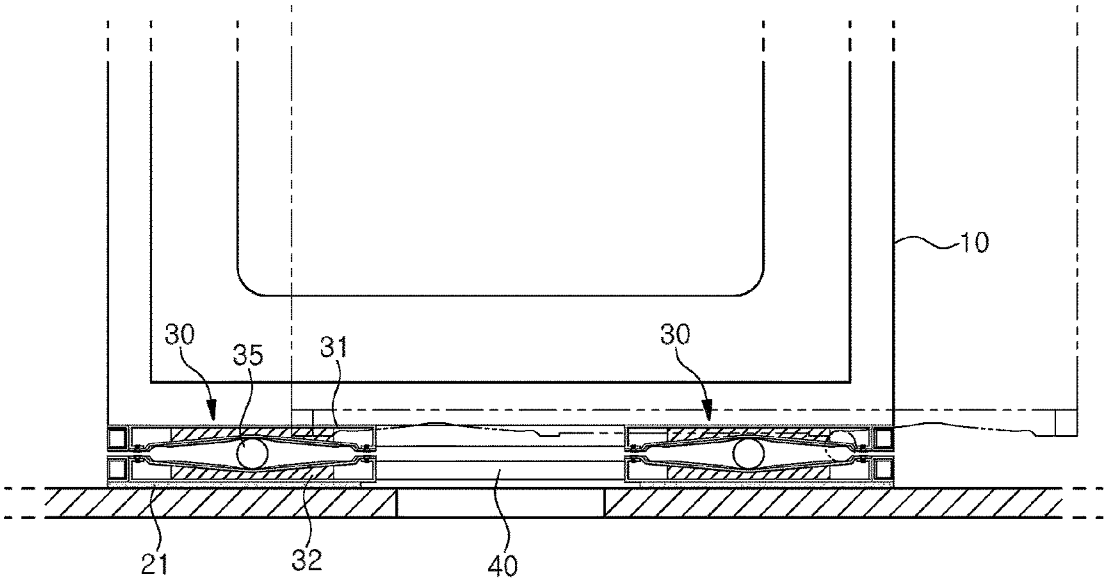
FIG. 3 is sectional view of the above embodiment of the invention
Figure 4:
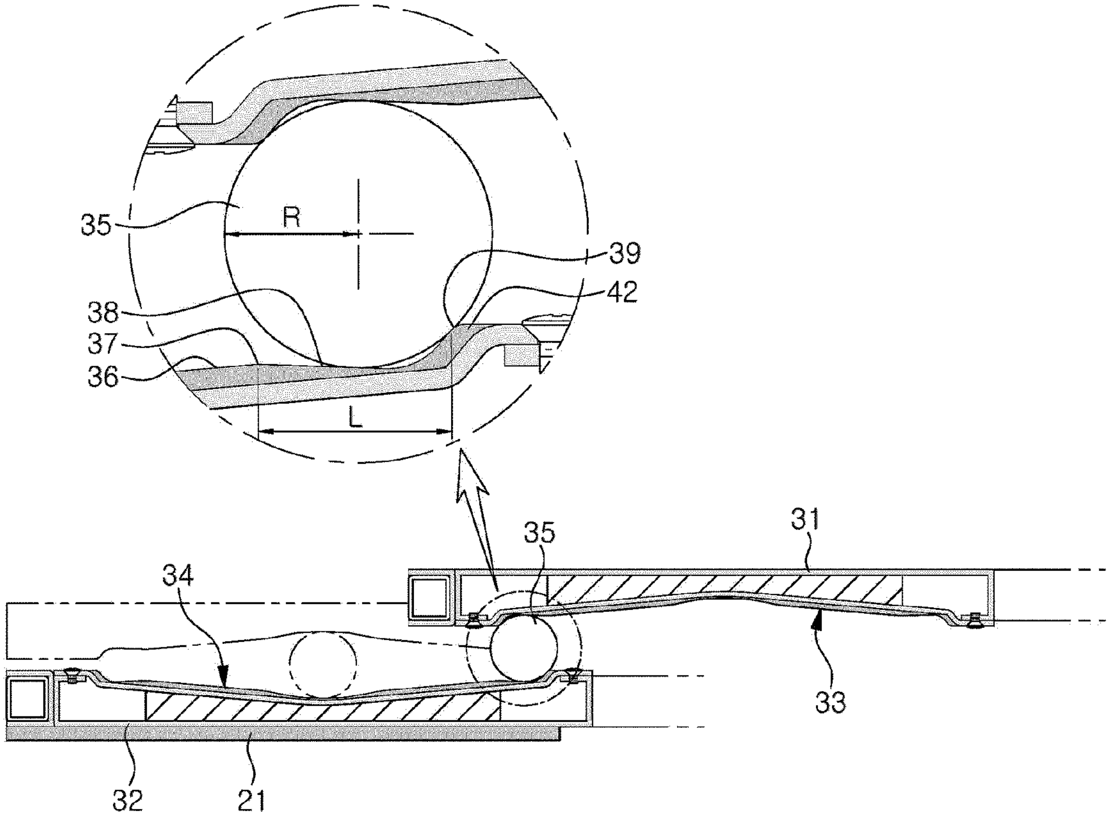
FIG. 4 is a view of operating state of the invention
Figure 5:
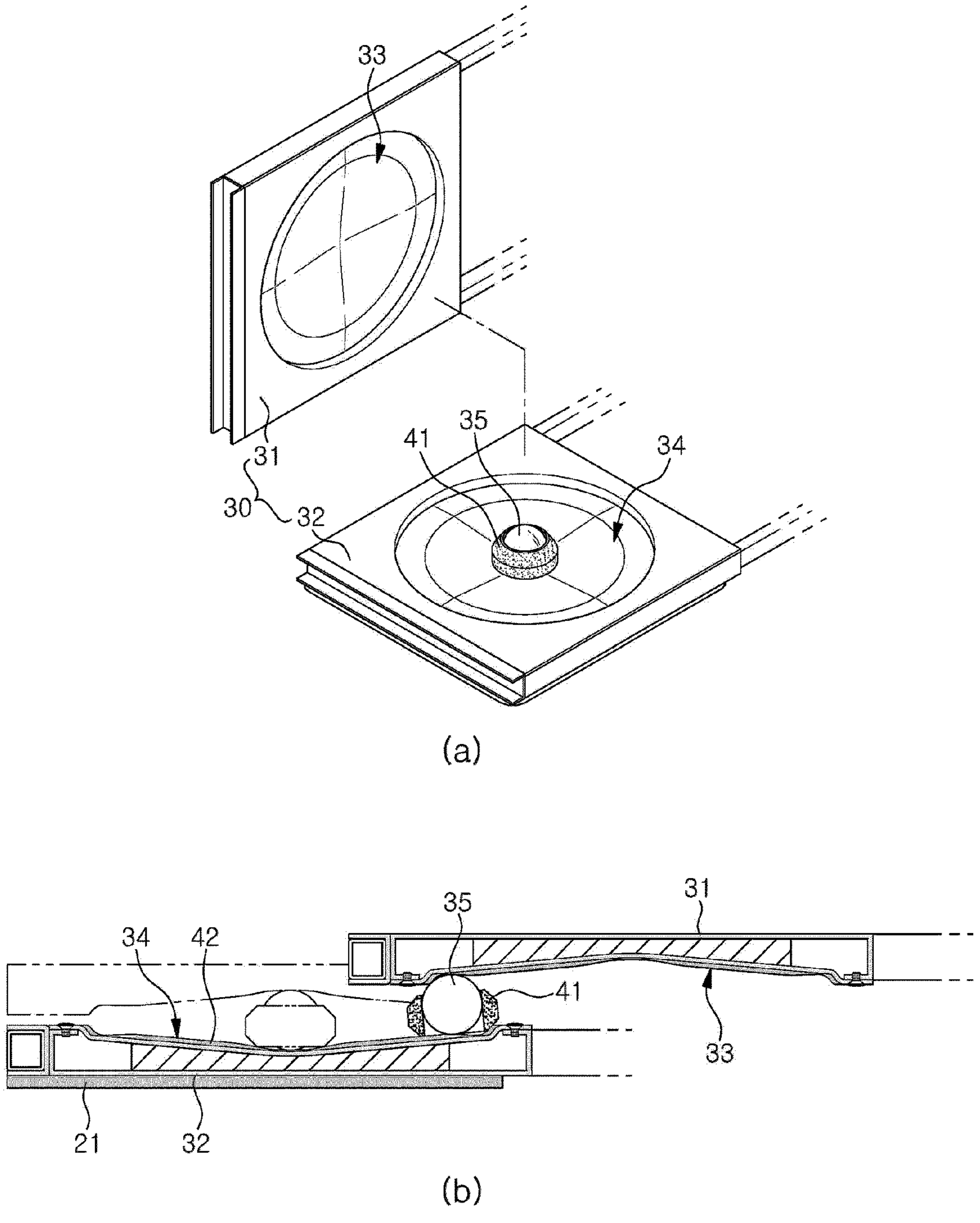
FIG. 5 is a view of the other embodiment of the invention

Detail of the invention including the isolation unit 30 is explained based on FIG. 2 to FIG. 4. As shown in FIG. 2 to FIG. 4, the upper panel 31 and the lower panel 32 have the same size to match each other, and are overlapped vertically facing to each other. A circular upper rolling recess 33 is formed on the bottom surface of the upper panel 31, and a lower rolling recess 34 with the same size of the upper rolling recess 33 is formed on the top surface of the lower panel 32. And a ball operator 35 is placed between the upper rolling surface 33 of the upper panel 31 and the lower rolling surface 34 of the lower panel 32.

The ball operator 35 inside the isolation unit 30 can roll so that the upper panel 31 can be relatively moved against the lower panel 32 and the protected object 10 placed on the upper panel 31 can be kept with the least movement during the earthquake.

The lower panel 32 is stably seated on the base pad 21, and the base pad 21 is made of elastic material and supports the isolation unit 30 on the floor firmly and stably so prevents the slip of the isolation unit 30.

The upper rolling recess 33 and the lower rolling recess 34 each include a central rolling surface 36 formed on the central part of the recess and an inflected rolling surface 38 formed around the central rolling surfaces 36. The central rolling surface 36 is recessed to be curved upward from the center to outside. The inflected rolling surface 38 is inflected against the central rolling surface 36, and along the border line between the central rolling surface 36 and the inflected rolling surface 38 is formed a peak-line 37. The inflected rolling surface 38 can extend horizontally or downward with small inclination, e.g. 1 degree or so.

A disengagement prevention wall 39 is formed around the upper rolling surface 33 and the lower rolling surface 34 along the periphery of the inflected rolling surface 38. The width of the inflected rolling surface 38 or the distance L between the peak-line 37 and the top of the disengagement prevention wall 39 is larger than the radius R of the ball operator 35, so that the ball operator 35 can roll over the peak-line 37 to be positioned on the inflected rolling surface 38.

According to the invention as described above, on isolating operation, the speed or acceleration of the ball operator 35 can be reduced while overriding the peak-line 37, and can perform the isolating operation stably. And the height of the disengagement prevention wall 39 can be raised without increasing the size of the upper panel 31 or the lower panel 32 to effectively prevent the ball operator 35 from breaking away or being disengaged from the isolator to achieve a compact structure of the isolator with stable isolating operation.

Referring FIGS. 5*a* and 5*b*, a ball guide 41 in ring shape can be engaged with the ball operator 35. The ball guide 41 is inserted around the ball operator 35 horizontally with the upper and the lower part of the ball operator 35 being exposed. The lower part of the ball guide 41 can contact the floor of the lower panel 32 during the isolating operation by linear or area contact to increase the friction force. Contrary to the conventional isolator not having ball guide 36 in which only the ball operator 35 contacts the floor of the lower panel 32 by point contact and may excessively slip, the ball guide 41 of the invention can contact the rolling surface of the lower panel 32 with increased friction, and stable moving and returning of the ball operator 41 is possible in case of large earthquake or long period vibration.

Even though the ball guide 41, preferably made of elastic material, is engaged with the ball operator 41, and the ball operator 35 can roll over the peak-line 37 with being inserted in the ball guide 41 to be placed on the inflected rolling surface 38. Then the ball guide 41 can contact the disengagement prevention wall 39 to absorb the shock, prevent the ball operator 35 from breaking away or being disengaged from the isolator, and reduce the return speed of the ball operator 35 toward the central rolling surface 36. Meanwhile, the elastic coating 42 preferably made of urethane material is coated on the central rolling surface 36, the inflected rolling surface 38 and the disengagement prevention wall 39 of the upper rolling surface 33 and the lower rolling surface 34. If the ball guide 41 contacts the elastic coating 42, excessive slipping of the ball operator 35 can be prevented, shock-absorbing is also attained and the moving speed of the ball operator 35 can be reduced to achieve stable isolating operation in case of large scale earthquake or long period vibration.

Figure 6:
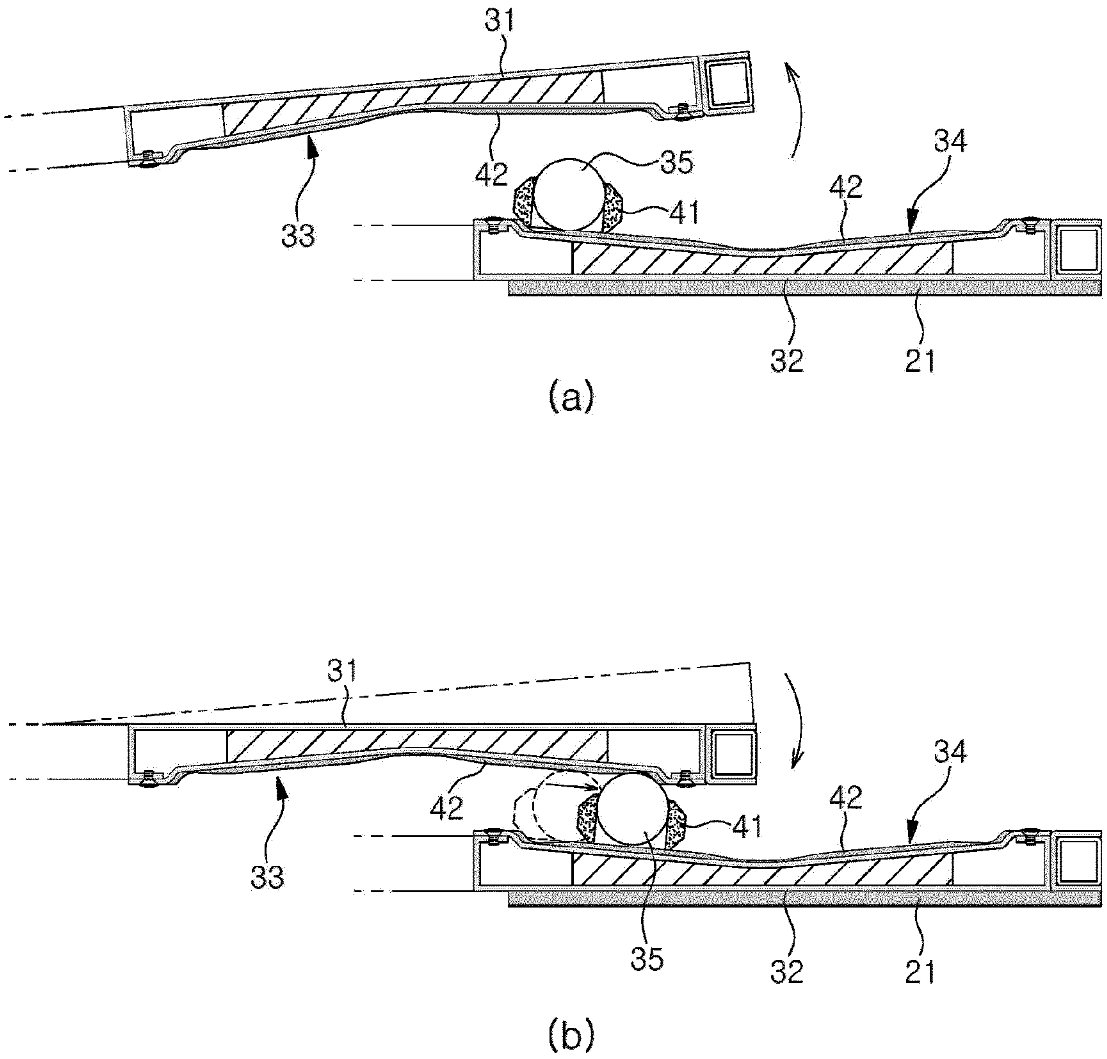
FIG. 6 is a view of operation of the above embodiment of FIG. 5
Figure 7:
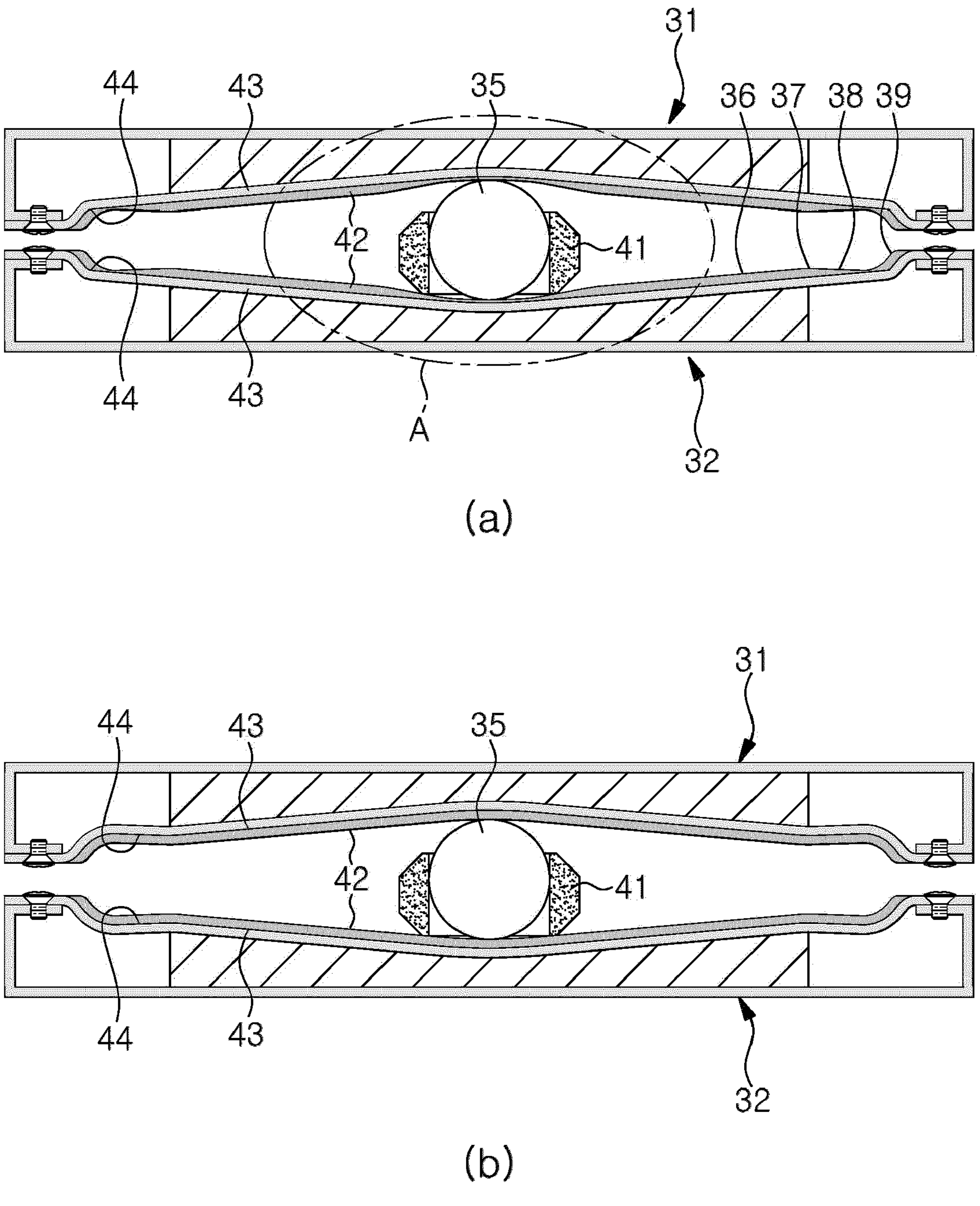
FIG. 7 is a sectional view of the modified embodiment of the invention
Figure 8:
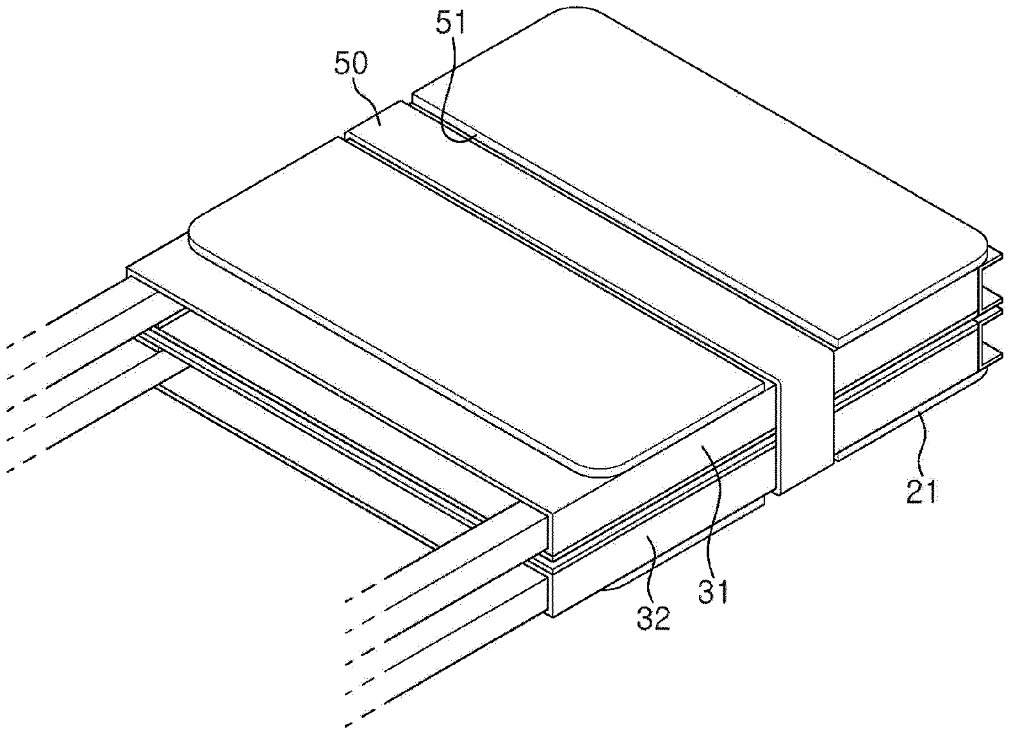
FIG. 8 is a view of the other embodiment of the invention
Figure 8:
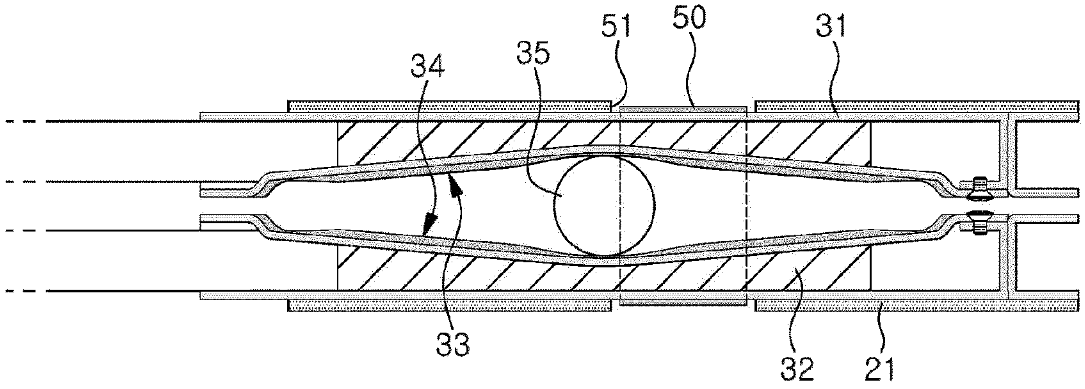
Figure 9:
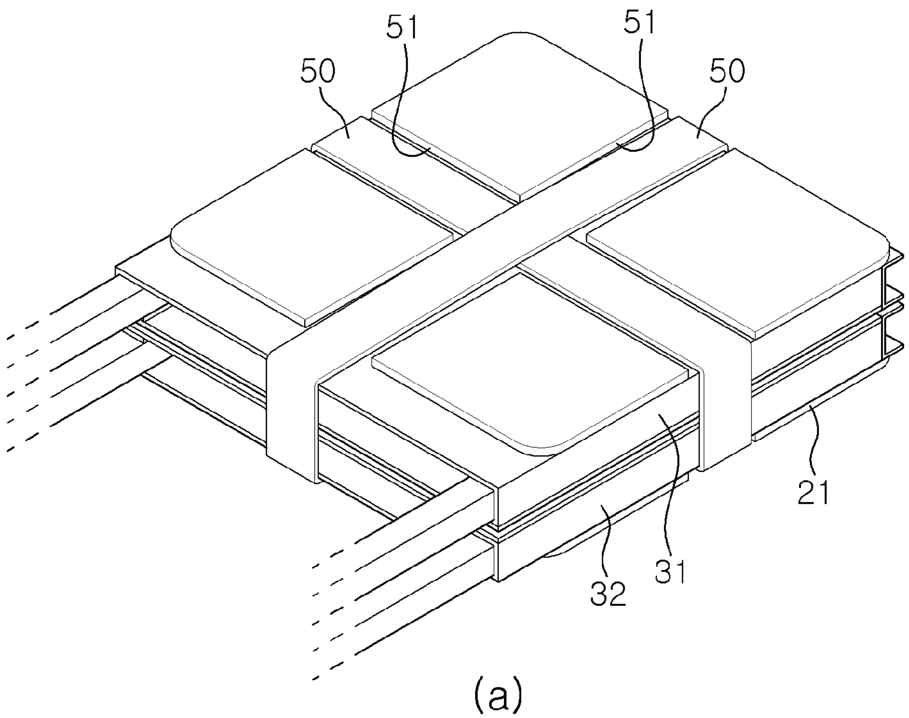
FIG. 9 is a view of modified embodiment of FIG. 8
Figure 9:
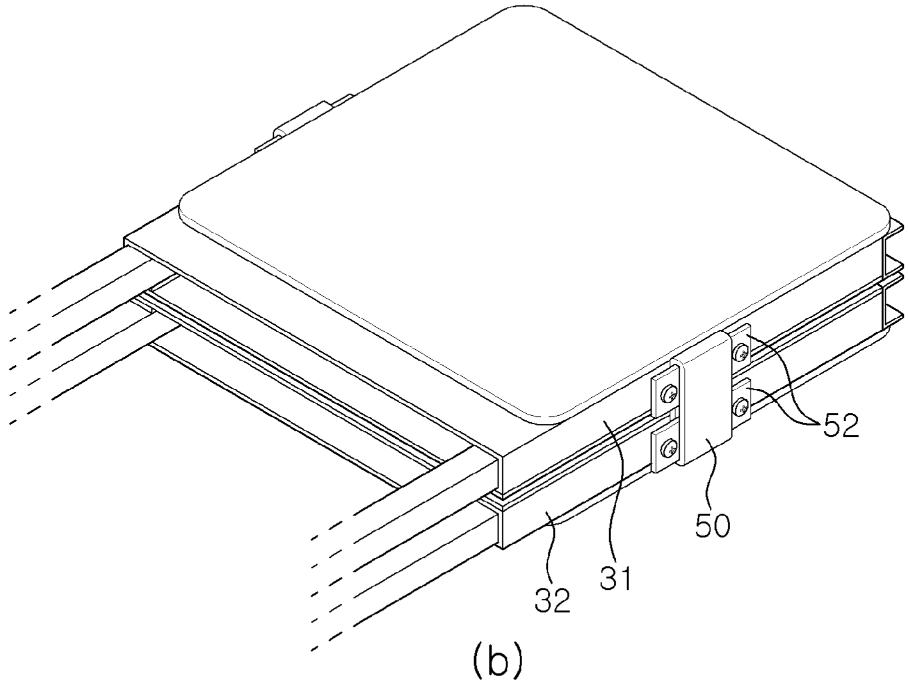

FIG. 6 shows the operation of the invention in which the upper panel 31 is lifted. As shown in FIGS. 6*a* and 6*b*, when the ball operator 35 moves on the central rolling surface 35 and the inflected rolling surface 38 by the horizontal or vertical vibration, the upper panel 31 can be lifted. At this time, the ball operator 35 moves together with the ball guide 41 which contacts the rolling surface by area contact on the elastic coating 42, so that the returning speed of the ball operator 35 is reduced, and when the upper panel 31 descends, the ball operator 35 does not escape from the upper panel 31 or the upper panel 31 does not strike the ball operator 35, but the ball operator 35 be kept inside the upper panel 31 to keep the regular rolling operation.

And, as shown in FIG. 7*a* and 7*b*, in order to make the upper rolling recess 33 and the lower rolling recess 34 into the inflected shape having a central rolling surface 36, an inflected rolling surface 38 and a peak-line 37, firstly the steel plate 43 should be bent to have a recess 44 with proper curvature, then elastic coating 42 is coated on the recess 44 with different coating thickness to form the central rolling surface 36, the peak-line 37 and the inflected rolling surface 38. Alternatively, the steel plate 43 itself can be bent to have the central rolling surface 36, the peak-line 37 and the inflected rolling surface 38, then the elastic coating 43 can be coated uniformly.

In order to prevent the upper panel 31 and the lower panel 32 from being separated by the vertically vibrating earthquake, these panels 31, 32 can be connected by elastic bands 50 as shown in FIGS. 8*a* and 8*b*. As shown, the upper panel 31 and the lower panel 32 are wrapped around by an elastic band 50. The elastic band 50 tightly contacts the surface of the upper and the lower panels 31, 32 to wrap around the isolator. A band groove 51 is formed on the surface of the upper and the lower panels 31, 32 to receive the elastic band 50, so that the elastic band 50 should not be pressed by weight of the protected object 10 on the upper panel 31 or by the lower panel 32 so that the elastic action of the elastic band 50 may not be disturbed.

The band groove 51 can be easily formed by attaching two pads with the thickness larger than the elastic band 50 on the surface of the panels 31, 32 with being separated to each other, and if the pad is made of elastic material, the shock-absorbing effect against the load can be enhanced.

As shown in FIG. 9*a*, two elastic bands 50 can be used to wrap around the isolator crossly. And as shown in FIG. 9*b*, the elastic band 50 can be attached only on the side of the upper and the lower panels 31, 32 by the band clamp 52. This elastic band 50 can enhance elastic coupling between the upper panel 31 and the lower panel 32, prevent the ball operator 35 from being disengaged or escaping, and make it possible to perform stable isolating operation irrespective of length of the period of vibration.

Figure 10:
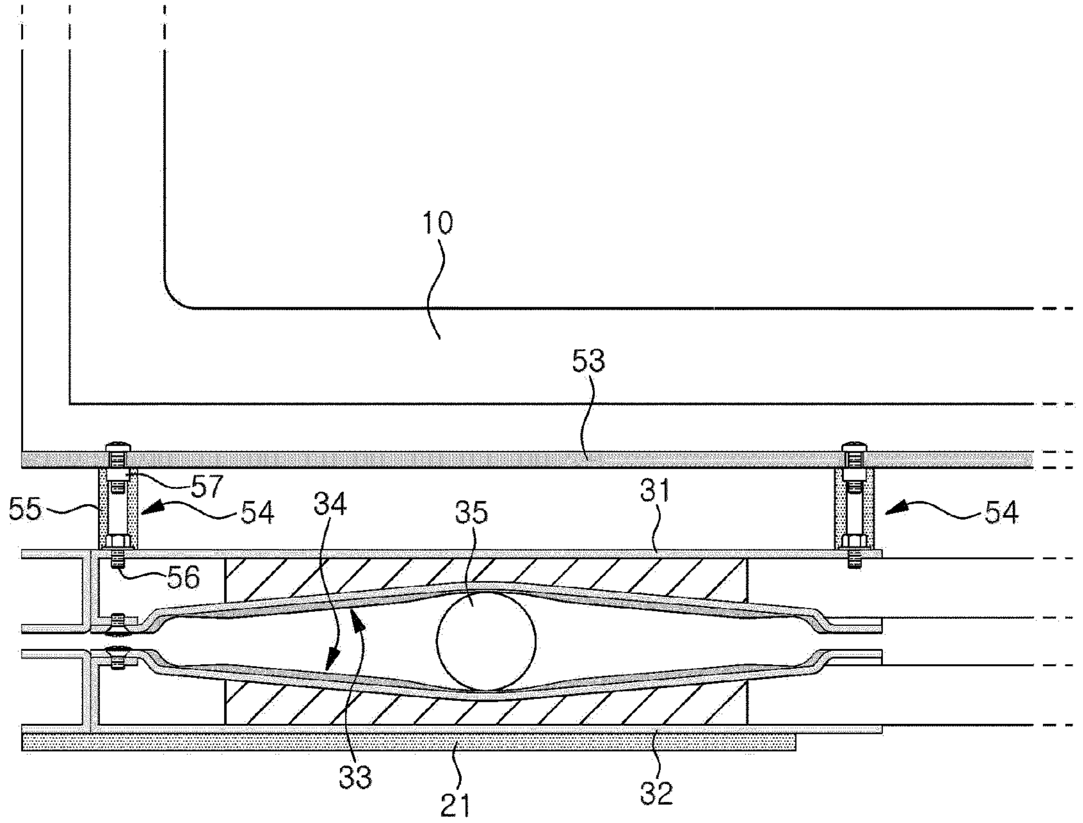
FIG. 10 is a view of still the other embodiment of the invention

As shown in FIG. 10, a separation plate 53 is further provided on the upper panel 31 spaced to each other. The separation plate 53 can be used to raise the height of the protected object 10 or for other purposes considering the installing situation. The separation plate 53 can be supported on the upper panel 31 by the separator disposed on the corner. Preferably the separator may be an elastic pole 54 to support the protected object 10 elastically. The elastic pole 54 may be comprised of an elastic body 55, a bolt 56 and a nut 57 embedded in the elastic body 55 and can be easily engaged by the bolt on the upper panel 31 and the nut on the separation plate 53.

Figure 11:
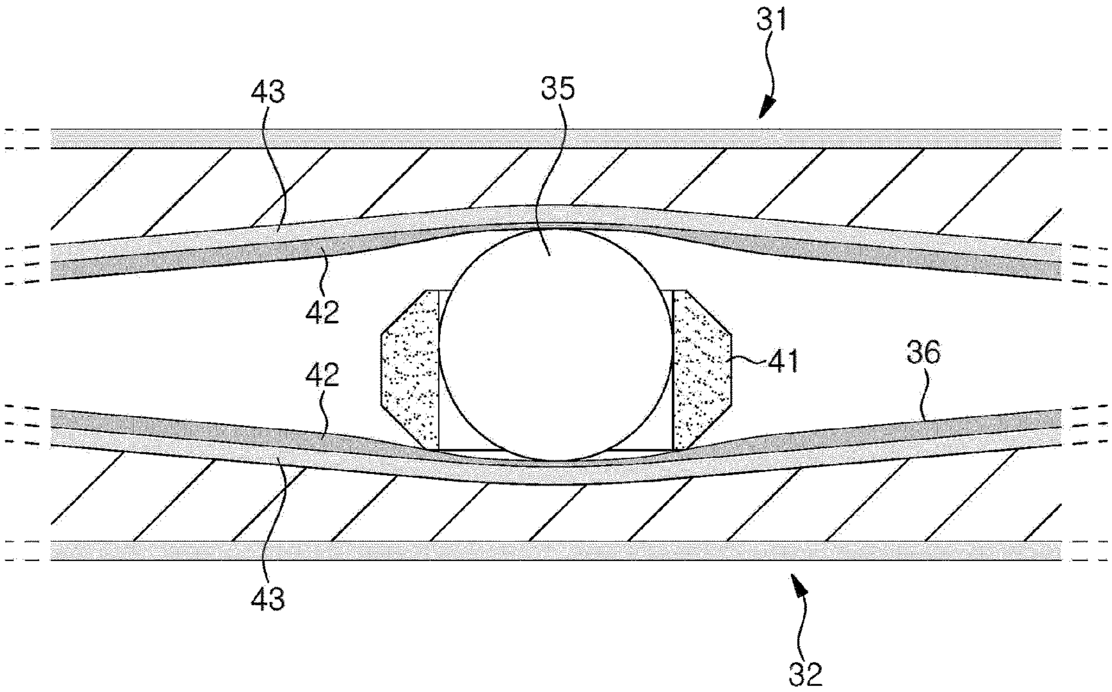
FIG. 11 is a partial enlarged view of A in FIG. 7

As shown in FIG. 11, the elastic coating 42 on the central rolling surface 36 is formed to become thicker progressively from the center to outward, by which, in case of large earthquake, the moving distance of the ball operator 35 can be reduced in proportion to the magnitude of earthquake. In this case, the starting point of the elastic coating 42 can be selectively determined on the central area of the rolling surface, and the elastic coating 42 on the central part of the rolling surface can be partially omitted or removed.

The scope of the invention is not restricted by the above mentioned preferred embodiment and the drawings, and various substitutions, changes and modifications can be possible without departing the idea of the invention.

The invention claimed is:

1. An isolator having a ball type operator comprising:

an upper panel 31 on which a protected object is placed and having an upper rolling recess 33 on a bottom surface thereof;

a lower panel 32 disposed on a floor corresponding to the upper panel 31 and having a lower rolling recess 34 on a top surface thereof, the lower rolling recess 34 facing the upper rolling recess 33 of the upper panel 31; and a ball operator 35 provided between the upper rolling recess 33 and the lower rolling recess 34 to roll between them, wherein at least the lower rolling recess 34 includes:

a central rolling surface 36 formed on a central part of the lower rolling recess 33, 34;

a peak-line 37 formed along an upper edge of the central rolling surface 36;

an inflected rolling surface 38 formed around the peak-line 37, inflected with respect to the central rolling surface 36, and extending outward horizontally or downward from the peak-line 37; and a disengagement prevention wall 39 formed around an edge of the inflected rolling surface 38 and extending upward to prevent the ball operator 35 from disengaging.

2. The isolator having a ball type operator of claim 1, wherein a ring shape ball guide 41 is inserted around the ball operator 35.

3. The isolator having a ball type operator of claim 1, wherein a sticky base pad 21 made of elastic material is provided under the lower panel 32.

4. The isolator having a ball type operator of claim 1, wherein elastic coatings 42 are provided on surfaces of the upper rolling recess 33 and the lower rolling recess 34, including the disengagement prevention wall 39.

5. The isolator having a ball type operator of claim 1, wherein the upper panel 31 and the lower panel 32 are connected by elastic bands 50.

6. The isolator having a ball type operator of claim 1, wherein a separation plate 53 is provided above the upper panel 31 so as to be spaced apart from the upper panel 31.

7. The isolator having a ball type operator of claim 6, wherein the separation plate 53 is supported on the upper panel 31 by elastic poles 54.

8. The isolator having a ball type operator of claim 4, wherein at least one of the elastic coatings 42 provided on the central rolling surface 36 has a thickness that progressively increases outward from a center of the central rolling surface 36.

* * * * *